US011086385B2

(12) United States Patent
Lee et al.

(10) Patent No.: US 11,086,385 B2
(45) Date of Patent: Aug. 10, 2021

(54) GRAPHICS PROCESSING UNIT HAVING TEMPERATURE EFFECT INVERSION AND OPERATION METHOD THEREOF

(71) Applicant: ELECTRONICS AND TELECOMMUNICATIONS RESEARCH INSTITUTE, Daejeon (KR)

(72) Inventors: Sukho Lee, Daejeon (KR); Jae-Jin Lee, Daejeon (KR); Kyuseung Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 105 days.

(21) Appl. No.: 16/165,878

(22) Filed: Oct. 19, 2018

(65) Prior Publication Data

US 2019/0179397 A1 Jun. 13, 2019

(30) Foreign Application Priority Data

Dec. 8, 2017 (KR) .................. 10-2017-0168269

(51) Int. Cl.
*G06F 1/324* (2019.01)
*G06F 1/08* (2006.01)
(Continued)

(52) U.S. Cl.
CPC ............... *G06F 1/324* (2013.01); *G06F 1/08* (2013.01); *G06F 1/28* (2013.01); *G06F 1/3206* (2013.01);
(Continued)

(58) Field of Classification Search
CPC combination set(s) only.
See application file for complete search history.

(56) References Cited

U.S. PATENT DOCUMENTS 8,766,704 B2* 7/2014 Takayanagi ............. G06F 1/206
327/513
8,773,194 B2* 7/2014 Yao ........................ H02M 3/02
327/513
(Continued)

FOREIGN PATENT DOCUMENTS

EP 2593860 A2 5/2013
JP 2016-106327 A 6/2016
(Continued)

OTHER PUBLICATIONS

Kyuseung Han et al., "TEI-NoC: Optimizing Ultra-Low Power NoCs Exploiting the Temperature Effect Inversion", IEEE Transactions on Computer-Aided Design of Integrated Circuits and Systems, 2016, pp. 1-13, IEEE.
(Continued)

*Primary Examiner* — Raymond N Phan

(57) ABSTRACT

Provided is a graphics processing unit and an operation method thereof. The graphics processing unit includes a plurality of cores in which a delay time between an input and an output decreases according to an increase of a temperature, a temperature monitoring and sorting circuit configured to monitor a temperature of each of the plurality of cores, and a controller configured to control a clock frequency and a power supply of the plurality of cores based on a drivable clock frequency of a core having the lowest temperature among temperatures of each of the plurality of monitored cores.

15 Claims, 7 Drawing Sheets

(51) Int. Cl.
*G06T 1/20* (2006.01)
*G06F 1/3206* (2019.01)
*G06F 1/3296* (2019.01)
*G06F 1/28* (2006.01)
*G06F 11/34* (2006.01)

(52) U.S. Cl.
CPC ........ *G06F 1/3296* (2013.01); *G06F 11/3409* (2013.01); *G06T 1/20* (2013.01)

(56) References Cited

U.S. PATENT DOCUMENTS

| | | | | |
|---|---|---|---|---|
| 2006/0010353 A1* | 1/2006 | Haugh | ................... | G06F 1/206 714/47.2 |
| 2012/0209449 A1* | 8/2012 | Alon | ................... | G05D 23/1931 700/300 |
| 2014/0089881 A1* | 3/2014 | Tetelbaum | ............. | G06F 30/39 716/113 |
| 2015/0046685 A1* | 2/2015 | Park | ..................... | G06F 1/3287 712/220 |
| 2017/0052891 A1 | 2/2017 | Pak et al. | | |
| 2017/0222648 A1* | 8/2017 | Lee | ................... | H03K 17/9638 |
| 2018/0145671 A1* | 5/2018 | Lee | ........................ | H03K 5/134 |

FOREIGN PATENT DOCUMENTS

| | | |
|---|---|---|
| KR | 10-1723127 B1 | 4/2017 |
| KR | 10-2017-0092437 A | 8/2017 |
| KR | 10-2018-0041039 A | 4/2018 |
| KR | 10-2018-0058612 A | 6/2018 |

OTHER PUBLICATIONS

Woojoo Lee et al., "Dynamic Thermal Management for FinFET-Based Circuits Exploiting the Temperature Effect Inversion Phenomenon", ACM/IEEE ISLPED 2014, Aug. 11-13, 2014, pp. 105-110, ACM.

* cited by examiner

GRAPHICS PROCESSING UNIT HAVING TEMPERATURE EFFECT INVERSION AND OPERATION METHOD THEREOF

CROSS-REFERENCE TO RELATED APPLICATIONS

This U.S. non-provisional patent application claims priority under 35 U.S.C. § 119 of Korean Patent Application No. 10-2017-0168269, filed on Dec. 8, 2017, the entire contents of which are hereby incorporated by reference.

BACKGROUND

The present disclosure herein relates to a graphics processing unit and an operation method thereof, and more particularly, to a multi-core management using temperature-effect-inversion (TEI).

A graphics processing unit (GPU) is an electronic circuit designed to process image information and output it to a display. The GPU may be included in a variety of electronic devices, such as embedded systems, terminals, personal computers, workstations, or video game console devices. The GPU may process image information quickly and effectively using a multi-threading scheme that processes a plurality of threads in parallel. To this end, the GPU may be implemented as a multiprocessor including a plurality of cores.

Recent GPUs may be used not only for image processing, but also for General-Purpose Computing on Graphics Processing Unit (GPGPU) such as the calculation of applications executed by a CPU. The GPU is recognized as an essential component of computer hardware because of the development of performance due to integration and the emergence of the GPGPU. However, the integration degree of the GPU may result in high power density. Therefore, there is a demand for ensuring the efficiency of operation due to limited power supply such as a battery or the like. There is also a need for a methodology for simultaneously achieving the power management and the performance of the GPU.

SUMMARY

The present disclosure is to provide a graphics processing unit capable of efficiently managing power using temperature-effect-inversion and ensuring the speed of information processing, and an operation method thereof.

An embodiment of the inventive concept provides a graphics processing unit including: a plurality of cores in which a delay time between an input and an output decreases according to an increase of a temperature; a temperature monitoring and sorting circuit configured to monitor a temperature of each of the plurality of cores; and a controller configured to control a clock frequency and a power supply of the plurality of cores based on a drivable clock frequency of a core having the lowest temperature among temperatures of each of the plurality of monitored cores.

In an embodiment, each of the plurality of cores may include a temperature sensor for sensing a temperature.

In an embodiment, the controller may compare the maximum drivable clock frequency of the core having the lowest temperature with a current operating clock frequency to adjust the operating clock frequency and determine a core to which the power is supplied.

In an embodiment, when the maximum clock frequency is higher than the operating clock frequency by a multiple of the reference value, the controller may increase the operating clock frequency by a multiple of the reference value and supply the power to cores of the inverse number of the reference value among the plurality of cores.

In an embodiment, when the maximum clock frequency is lower than the operating clock frequency, the controller may lower the operating clock frequency and increase the number of cores to which the power is supplied.

In an embodiment, the controller may include: a frequency controller configured to control the operating clock frequency by referring to a look-up table storing information on a maximum clock frequency according to a temperature of a core; and a thread allocation circuit configured to allocate a thread to the core to which the power is supplied by referring to the look-up table.

In an embodiment, the graphics processing unit may further include a plurality of transistors connected to the plurality of cores, respectively, to transmit the power to a corresponding core or interrupt the power according to a control of the controller.

In an embodiment, when the maximum drivable clock frequency of the core having the lowest temperature is higher than the current operating clock frequency, the controller may determine a portion of the plurality of cores to which the power is to be supplied based on a temperature of each of the plurality of cores.

In an embodiment, a driving voltage for driving the plurality of cores may be an Ultra-Low Voltage (ULV) of 1 V or less.

In an embodiment of the inventive concept, an operation method of a graphics processing unit includes: sensing a temperature of each of a plurality of cores in which a delay time between an input and an output decreases according to an increase of a temperature; comparing the maximum clock frequency of a core having the lowest temperature among the sensed temperatures of the plurality of sensed cores with an operating clock frequency of the plurality of cores; adjusting the operating clock frequency based on a result of comparison between the maximum clock frequency and the operating clock frequency; and determining a core to which power is provided based on the comparison result.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

Figure 1:
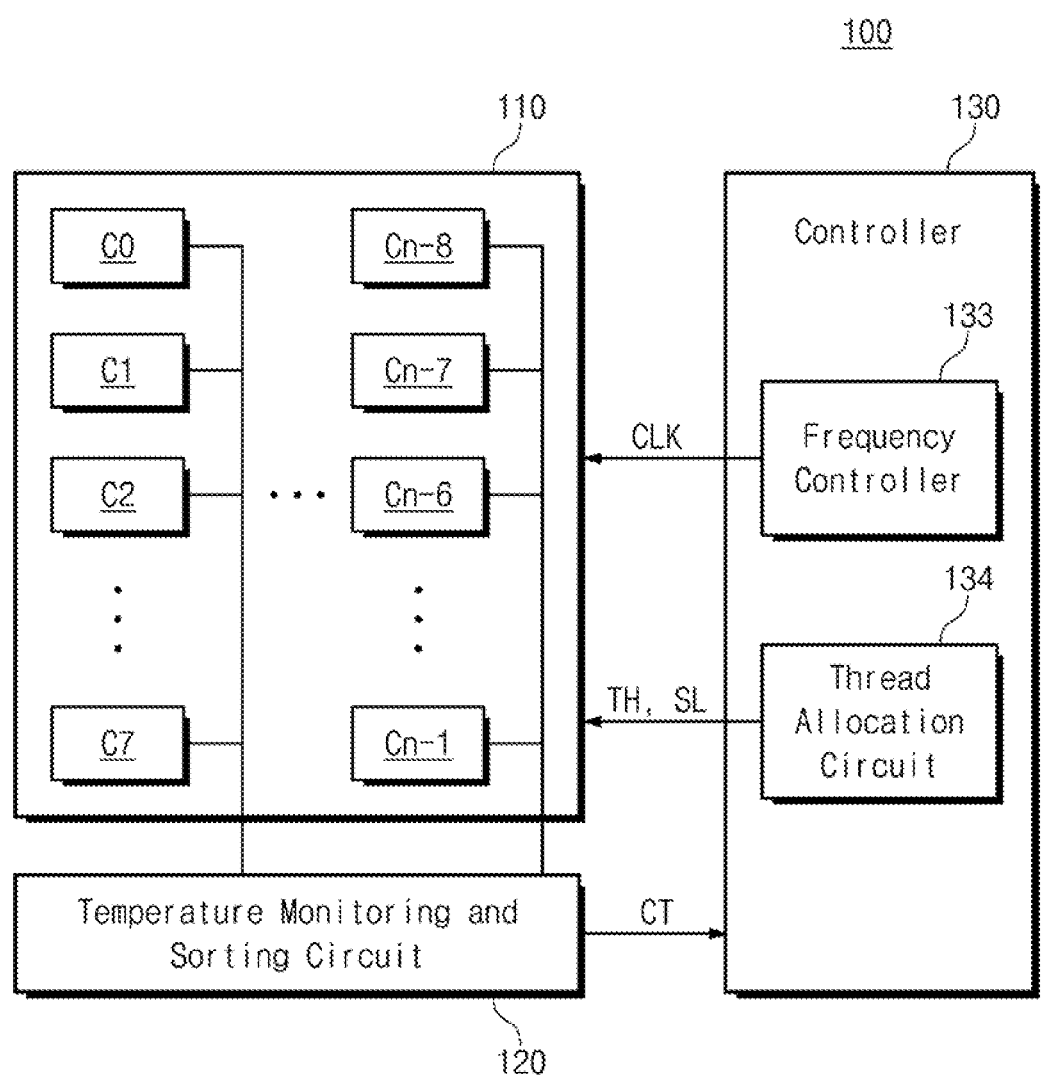
FIG. 1 is a block diagram of a graphics processing unit according to an embodiment of an inventive concept.

FIG. 1 is a block diagram of a graphics processing unit according to an embodiment of an inventive concept. Referring to FIG. 1, a graphics processing unit 100 may include an execution unit 110, a temperature monitoring and sorting circuit 120, and a controller 130. The execution unit 110 may include a plurality of cores C0 to Cn−1. Although not shown in the drawing, the execution unit 110 may further include a plurality of special function units for executing instructions such as a trigonometric function or a square root operation. The execution unit 110 may further include a plurality of load/store units that execute a store instruction to store data in a memory (not shown), or execute a load instruction to read data from a memory (not shown).

The execution unit 110 may perform a logic operation such as a multiplication operation or an addition operation using a plurality of cores C0 to Cn−1. For example, a plurality of cores C0 to Cn−1 may perform a floating-point multiply operation. The execution unit 110 may process a plurality of threads using the plurality of cores C0 to Cn−1. For example, the execution unit 110 may process n threads per cycle. The plurality of cores C0 to Cn−1 may process a plurality of threads in parallel using a pipelined method. The plurality of cores C0 to Cn−1 processes the allocated threads based on the same clock frequency. The processing speed for the threads of the plurality of cores C0 to Cn−1 may be determined by the clock frequency.

The plurality of cores C0 to Cn−1 have a decreased delay time between input and output as the temperature increases. The delay time may be a propagation delay time that occurs when a signal propagates into the circuit of the plurality of cores C0 to Cn−1. That is, the plurality of cores C0 to Cn−1 may be implemented to have a temperature-effect inversion (TEI) characteristic. The plurality of cores C0 to Cn−1 may be configured with various semiconductor elements such as a FinFET, a MOSFET, and a multi-gate transistor (or a dual gate transistor). In addition, the plurality of cores C0 to Cn−1 may operate in Ultra-Low Voltage (ULV). For example, the ULV may mean a driving voltage of about 1 V or less. As the temperature increases under the above-described conditions, the drivable speed of the plurality of cores C0 to Cn−1 may increase.

Each of the plurality of cores C0 to Cn−1 may represent different temperatures in the course of processing the threads. For example, the first core C1 may perform more operations than the second core C2 to exhibit a high temperature. In this case, the drivable speed of the first core C1 based on the TEI may be higher than the drivable speed of the second core C2. The drivable speed of the core having the lowest temperature among the plurality of cores C0 to Cn−1 may be the slowest. When the drivable speed of the core having the lowest temperature is faster than the driving speed of the current execution unit 110, an increase in the clock frequency is possible. In this case, the thread processing speed of each of the plurality of cores C0 to Cn−1 may be improved.

The temperature monitoring and sorting circuit 120 monitors the temperature of each of the plurality of cores C0 to Cn−1. For this, the temperature monitoring and sorting circuit 120 may be connected to each of the plurality of cores C0 to Cn−1. In order to increase the temperature of the execution unit 110, detection of the core with the lowest temperature may be required. The temperature monitoring and sorting circuit 120 may detect the temperature of the core having the lowest temperature among the plurality of cores C0 to Cn−1. However, the inventive concept is not limited thereto, and the core having the lowest temperature may be determined by the controller 130.

The temperature monitoring and sorting circuit 120 may monitor the temperature of each of the plurality of cores C0 to Cn−1 to generate core temperature information CT. The core temperature information CT may include temperature information of each of the plurality of cores C0 to Cn−1. The temperature monitoring and sorting circuit 120 may sort the temperature information of each of the plurality of cores C0 to Cn−1 in the order of temperature. The core having the lowest temperature may be determined by the temperature monitoring and sorting circuit 120 or the controller 130. Alternatively, the core temperature information CT may be information on the temperature of the core having the lowest temperature as a result of sorting the temperatures of the plurality of cores C0 to Cn−1. In this case, the controller 130 may adjust the clock frequency based on the core temperature information CT.

The controller 130 controls the overall operation of the execution unit 110. The controller 130 may control the operation speed, thread distribution, and power supply of the plurality of cores C0 to Cn−1. For this end, the controller 130 may include a frequency controller 133 and a thread allocation circuit 134. The controller 130 may control the operation of the execution unit 110 based on the temperature of each of the plurality of cores C0 to Cn−1 monitored by the temperature monitoring and sorting circuit 120. The controller 130 may receive the core temperature information CT from the temperature monitoring and sorting circuit 120.

The controller 130 may determine the lowest temperature of a core based on the core temperature information CT. The controller 130 may determine the maximum clock frequency that is drivable in the core having the lowest temperature (hereinafter referred to as the maximum clock frequency). The controller 130 may search for the maximum clock frequency corresponding to the temperature by referring to the look-up table. The controller 130 may include a look-up table in which information on the maximum clock frequency according to the temperature of the core is stored. However, without being limited thereto, the controller 130 may include an electronic circuit for calculating the maximum clock frequency from the lowest temperature value of the core.

The frequency controller 133 may determine the operating clock frequency of the clock signal CLK for the operation of the execution unit 110. When the maximum clock frequency of the core with the lowest temperature is higher than the current operating clock frequency, the frequency controller 133 may increase the operating clock frequency of the clock signal CLK. As the temperature increases by TEI, the drivable speed of the core increases, so that the core with the lowest temperature has the slowest drivable speed among the plurality of cores C0 to Cn−1. Thus, all of the plurality of cores C0 to Cn−1 may operate normally at an increased operating clock frequency.

When the maximum clock frequency is higher than the current operating clock frequency by k times the reference value, the frequency controller 133 may increase the operating clock frequency of the clock signal CLK by k times. The reference value k may be a real number greater than one. For example, when the maximum clock frequency is two times higher than the current operating clock frequency, the frequency controller 133 may increase the operating clock frequency by two times. In this case, the processing speed of each of the plurality of cores C0 to Cn−1 may be doubled.

The frequency controller 133 may continuously adjust the operating clock frequency according to the temperature of the plurality of sensed cores C0 to Cn−1. The temperature of the plurality of cores C0 to Cn−1 may vary based on power supplied, speed, and other environmental factors. The frequency controller 133 may re-adjust the operating clock frequency according to the result of re-comparing the maximum drivable clock frequency of the core having the lowest temperature with the currently adjusted operating clock frequency. For example, when the temperature of the core is lowered and the maximum clock frequency is lower than the operating clock frequency increased by k times, the frequency controller 133 may lower the operating clock frequency. Conversely, when the temperature of the core rises and the maximum clock frequency becomes higher than the operating clock frequency increased by k times, the frequency controller 133 may increase the operating clock frequency once more.

The thread allocation circuit 134 may determine the cores to be powered. The thread allocation circuit 134 may control each of the plurality of cores C0 to Cn−1 to be activated or deactivated. When the maximum clock frequency of the core with the lowest temperature is higher than the current operating clock frequency, the thread allocation circuit 134 may activate some of the plurality of cores C0 to Cn−1 and deactivate the remaining cores. The activated cores are provided with power to process the allocated thread information TH. Deactivated cores do not operate due to power interruption.

When the maximum clock frequency is higher than the current operating clock frequency by k times the reference value, 1/k of the plurality of cores C0 to Cn−1 may be activated. In addition, the thread allocation circuit 134 may deactivate the remaining cores. For example, when the maximum clock frequency is more than two times the current operating clock frequency, the thread allocation circuit 134 may activate half of the cores C0 to Cn−1 and deactivate the remaining half of the cores.

As the temperature increases by TEI, the drivable speed of the core increases. Accordingly, the frequency controller 133 may increase the operating clock frequency of the clock signal CLK provided throughout the plurality of cores C0 to Cn−1 as the temperature increases. However, the increase rate of the power consumption of the execution unit 110 due to the increase of the operating clock frequency is smaller than the increase rate of the operating clock frequency. For example, when the operating clock frequency is increased by two times, the increase in power consumption may be less than two times. In this case, even when the thread allocation circuit 134 controls only half cores to be operated, the thread processing speed of the execution unit 110 is maintained. Also, the power consumption of the execution unit 110 decreases. The details will be described later with reference to FIG. 4.

The thread allocation circuit 134 may continuously adjust the number of cores to be activated according to the temperature of the plurality of sensed cores C0 to Cn−1. The thread allocation circuit 134 may again determine the cores to be powered according to the result of a re-comparison of the current operating clock frequency with the maximum drivable clock frequency of the core having the lowest temperature. For example, as the temperature of the core is lowered, when the maximum clock frequency is lower than the operating clock frequency increased by k times, the thread allocation circuit 134 may increase the number of cores to supply power. Conversely, as the temperature of the core rises, when the maximum clock frequency becomes higher than the operating clock frequency increased by k times, the thread allocation circuit 134 may reduce the number of cores to supply power once more.

The thread allocation circuit 134 may generate a sleep signal SL for determining activation or deactivation of the plurality of cores C0 to Cn−1. The plurality of cores C0 to Cn−1 may be activated or deactivated based on the sleep signal SL. For example, the cores receiving the high level slip signal SL may be inactivated and the power may be interrupted, and the cores receiving the low level slip signal SL may be activated and supplied with power. The thread allocation circuit 134 may determine the cores to be activated according to the temperature of each of the plurality of cores C0 to Cn−1. For example, the thread allocation circuit 134 may activate the cores in order of higher sensed temperature. When the thread allocation circuit 134 activates half of the cores, the half of the high temperature cores may be activated.

The thread allocation circuit 134 may distribute the thread information TH to the activated cores among the plurality of cores C0 to Cn−1. When the thread allocation circuit 134 reduces the number of cores to be activated, it may redistribute the thread information TH so that the thread information TH is not allocated to inactivated cores. Further, thereafter, when the thread allocation circuit 134 increases the number of activated cores, it is possible to redistribute the thread information TH so that the thread information TH is allocated to the activated cores. The thread allocation circuit 134 may include a warp scheduler for distributing the thread information TH by a warp unit that groups a plurality of threads.

Figure 2:
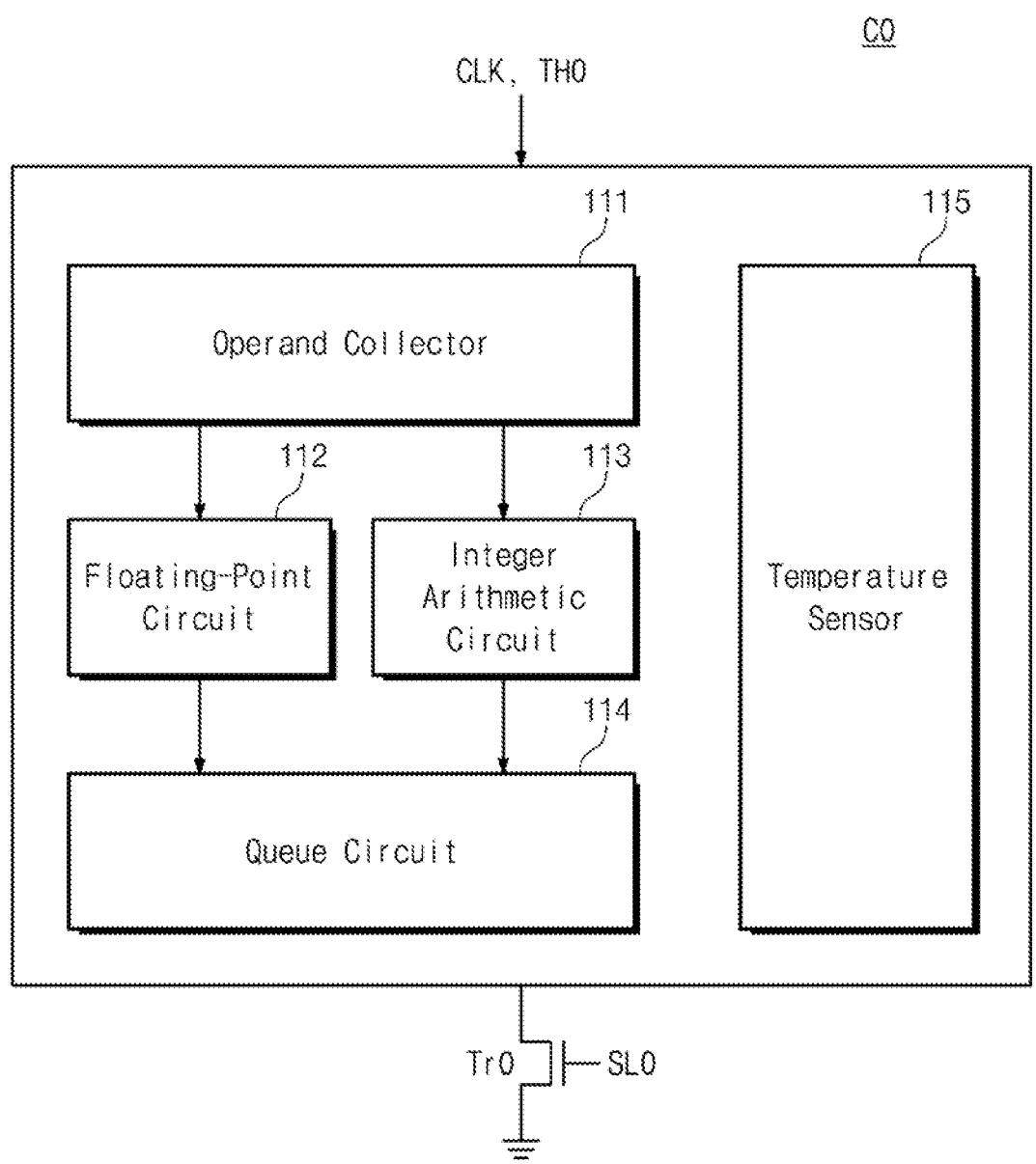
FIG. 2 is a block diagram showing an exemplary configuration of the core of FIG. 1.

FIG. 2 is a block diagram showing an exemplary configuration of the core of FIG. 1. Although the core of FIG. 2 is shown as the 0th core C0 of FIG. 1, it will be understood that it shows the configuration of each of a plurality of cores C0 to Cn−1. The core C0 of FIG. 2 will be understood as an example of being able to sense the temperature of the core C0 itself while satisfying the TEI. Referring to FIG. 2, the core C0 may include an operand collector 111, a floating-point circuit 112, an integer arithmetic circuit 113, a queue circuit 114, and a temperature sensor 115. Further, a transistor Tr0 for determining whether to activate the core C0 is connected to the core C0. For convenience of explanation, FIG. 2 will be described with reference to the reference numerals of FIG. 1.

The core C0 operates based on the clock signal CLK. The operation speed of the core C0 is determined according to the operating clock frequency of the clock signal CLK. When the core C0 is activated, the controller 130 allocates the thread information TH0 to the core C0. The core C0 executes an instruction corresponding to the thread information TH0. The operand collector 111 obtains operands for executing an integer operation or a floating-point operation from the thread information TH0.

The floating-point circuit 112 may perform a floating point operation using an operand obtained from the operand collector 111. The floating-point circuit 112 may perform mixed multiplication and addition operations. The integer arithmetic circuit 113 may perform an integer multiplication operation or an accumulation operation using an operand obtained from the operand collector 111. The queue circuit 114 receives the results computed from the floating-point circuit 112 or the integer arithmetic circuit 113. The queue circuit 114 may provide the inputted results to a memory (not shown).

The temperature sensor 115 senses the temperature of the core C0. Each of the plurality of cores C0 to Cn−1 includes a temperature sensor. That is, the temperature sensors provided in each of the plurality of cores C0 to Cn−1 sense the temperature of the corresponding cores. The temperature sensor 115 may include a temperature sensing element having a characteristic that varies depending on the temperature of the core. The temperature sensed by the temperature sensor 115 may be monitored by the temperature monitoring and sorting circuit 120. For this, the temperature sensor 115 and the temperature monitoring and sorting circuit 120 may be electrically connected to each other. Based on the temperature of the monitored core C0, the controller 130 may adjust the operating clock frequency and determine whether to power the core C0.

The transistor Tr0 may activate or deactivate the core C0 based on the sleep signal SL0. When activated, the core C0 is powered and may process the thread information TH0. When the operating clock frequency increases as the temperature of the plurality of cores C0 to Cn−1 increases, the core C0 may be deactivated. In this case, power supply to the core C0 may be interrupted, and the thread information TH0 may not be distributed to the core C0 under the control of the thread allocation circuit 134. The transistor Tr0 may include one terminal connected to the core C0, the other terminal to be grounded, and a control terminal receiving the sleep signal SL0. However, the inventive concept is not limited thereto. The transistor Tr0 is connected between the driving voltage source (not shown) and the core C0, so that it may determine whether to provide the driving voltage according to the control of the sleep signal SL0.

Figure 3:
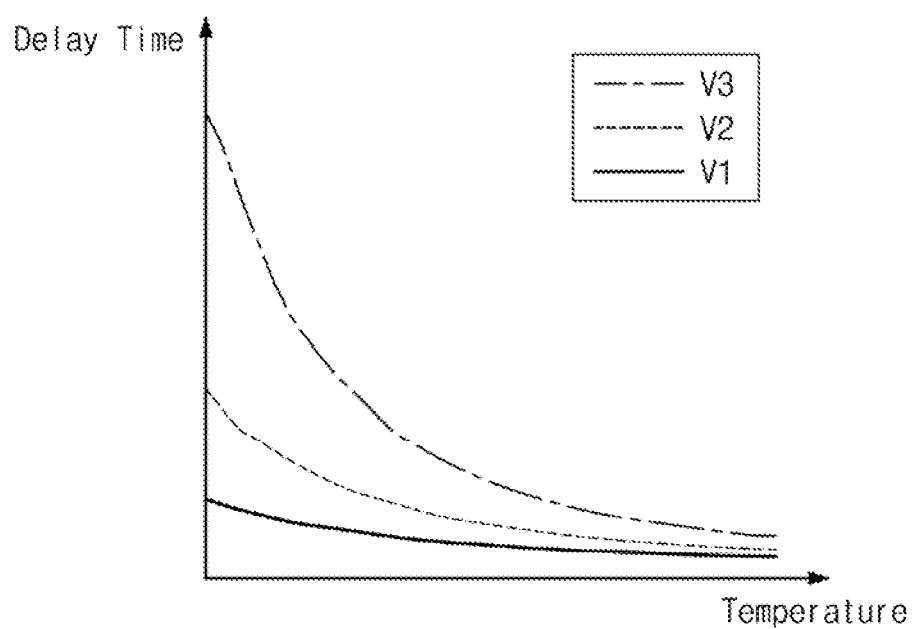
FIG. 3 is a graph for explaining the TEI of the core shown in FIG. 1.

FIG. 3 is a graph for explaining the TEI of the core shown in FIG. 1. Referring to FIG. 3, the horizontal axis represents the temperature and the vertical axis represents the delay time of the core. The delay time of the core is related to the processing time of each of the plurality of cores C0 to Cn−1. FIG. 3 shows the delay time of the core according to the temperature when the driving voltage of the core is the first voltage V1, the second voltage V2, or the third voltage V3. The graph for the first voltage V1 is indicated by a solid line, the graph for the second voltage V2 is indicated by a dotted line, and the graph for the third voltage V3 is indicated by a dash-dotted line. The first voltage V1 has a voltage level higher than the second voltage V2 and the second voltage V2 has a voltage level higher than the third voltage V3.

The first to third voltages V1 to V3 may be an ultra low voltage (ULV) level of 1 V or less. The delay time of an electronic circuit driven at a voltage level exceeding a conventional ULV increases with an increase in temperature. That is, as the temperature of the plurality of cores rises, the drivable speed is reduced, and the maximum drivable temperature of the cores is specified. In this case, a temperature management circuit is required so that the plurality of cores may not exceed the maximum temperature at which they are drivable. On the other hand, under the TEI condition as shown in the graph of FIG. 3, since the delay time decreases as the temperature rises, the restriction to increase the core speed decreases. Further, there is no need for a separate operation to increase the operating clock frequency, such as scaling of the driving voltage.

Consequently, under the conditions in which TEI appears, as the temperature increases, the delay time may decrease and the drivable speed of the core may increase. The drivable speed of the core having the lowest temperature among the plurality of cores C0 to Cn−1 of FIG. 1 will be the slowest. Thus, the graphics processing unit 100 uses the lowest core temperature to determine the operating clock frequency and the number of cores to be activated.

Figure 4:
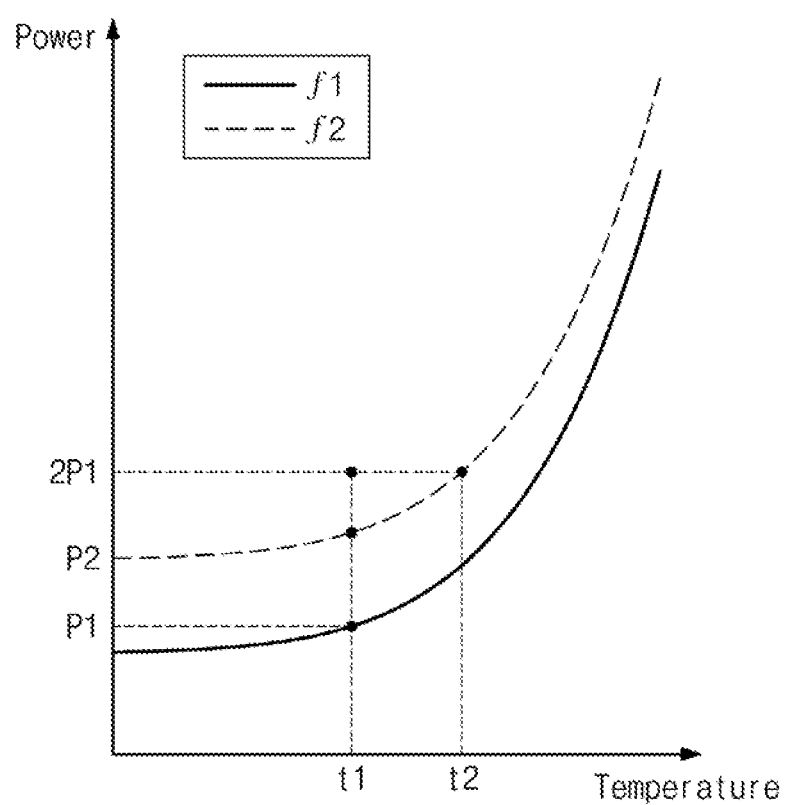
FIG. 4 is a graph for explaining power consumption according to temperature and clock frequency of the core shown in FIG. 1.

FIG. 4 is a graph for explaining power consumption according to temperature and clock frequency of the core shown in FIG. 1. Referring to FIG. 4, the horizontal axis represents the temperature and the vertical axis represents the power consumption of the core. The core temperature information CT may include temperature information of each of the plurality of cores C0 to Cn−1. FIG. 4 shows the power consumption of the core according to the temperature when the operating clock frequency of the core is the first frequency f1 or the second frequency f2. The graph for the first frequency f1 is represented by a solid line and the graph for the second frequency f2 is represented by a dotted line. It is assumed that the second frequency f2 is two times the first frequency f1. The core of FIG. 4 may satisfy TEI. That is, the driving voltage of the core may be an ultra low voltage (ULV) level.

At the first temperature t1, when the core operates at the first frequency f1, the core consumes power by the first power P1. At the first temperature t1, when the core operates at the second frequency f2, the core consumes power by the second power P2. The magnitude of the second power P2 is less than two times the magnitude of the first power P1. That is, even when the operating clock frequency of the core doubles, the power consumption of the core does not increase by two times. For example, under the same temperature condition, the power consumption when all of the plurality of cores C0 to Cn−1 operate at the first frequency f1 is less than the power consumption when half of the cores C0 to Cn−1 operate at the second frequency f2. Further, since the thread processing speed of each of the cores increases by an amount of increase in the operating clock frequency, the processing speed of the threads of the graphics processing unit 100 may be maintained.

The speed at which threads are processed when all of the plurality of cores C0 to Cn−1 are operating at the first frequency f1 may be identical to the speed at which threads are processed when the half of the plurality of cores C0 to Cn−1 are processed at the second frequency f2. However, when the plurality of cores C0 to Cn−1 do not satisfy the conditions for TEI, in order to reduce power consumption, it may be difficult to increase the operating clock frequency. When the delay time increases with increasing temperature, there is a restriction in increasing the operating clock frequency. Further, when the delay time increases as the temperature increases, the performance of the core is secured below the maximum drivable temperature value. When the temperature rises due to the operation of the core and exceeds the maximum temperature value, the core does not operate normally.

When the plurality of cores C0 to Cn−1 satisfy the TEI, the delay time decreases as the temperature increases. Therefore, even when the operating clock frequency of the core is increased, the core may operate normally. When the operating clock frequency is the first frequency f1, the second frequency f2 may be compared with the maximum drivable clock frequency of the core having the lowest temperature among the plurality of cores C0 to Cn−1. When the maximum clock frequency is higher than the second frequency f2, the operating clock frequency may be adjusted to the second frequency f2. Further, half of the plurality of cores C0 to Cn−1 may be activated, and the other half may be deactivated.

At the second temperature t2, when the core operates at the second frequency f2, the core consumes twice as much power as the first power P1. The second temperature t2 is higher than the first temperature t1. In the course that the core performs the same operation, when the number of activated cores is halved and the operating clock frequency is doubled, the power consumption may be reduced in a range where the temperature of the core is lower than the second temperature t2. As the temperature of the core increases, the power consumption of the core increases. However, as the temperature of the core increases, the ratio of the power consumption at the second frequency f2 to the power consumption at the first frequency f1 decreases. Thus, as the temperature of the core increases, the rate of reduction in power consumption may be further increased by reducing the number of cores to be activated and increasing the operating clock frequency.

Figure 5:
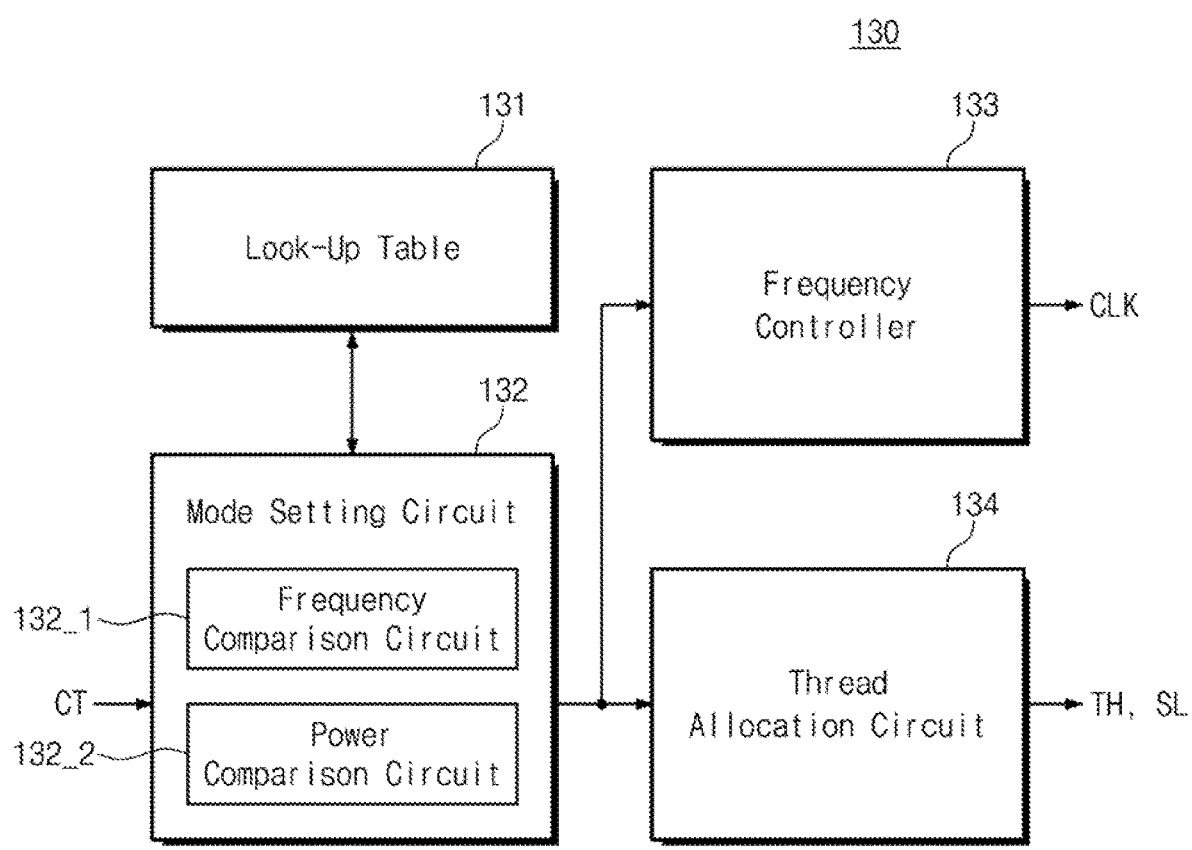
FIG. 5 is a block diagram showing an exemplary configuration of the controller of FIG. 1.

FIG. 5 is a block diagram showing an exemplary configuration of the controller of FIG. 1. The controller 130 of FIG. 5 will be understood as one example for determining the operating clock frequency and whether to activate the plurality of cores C0 to Cn−1 according to the temperatures of the plurality of cores C0 to Cn−1. Referring to FIG. 5, the controller 130 includes a look-up table 131, a mode setting circuit 132, a frequency controller 133, and a thread allocation circuit 134. For convenience of explanation, FIG. 5 will be described with reference to the reference numerals of FIG. 1.

The look-up table 131 stores information on the maximum operating speed according to the temperature of the core. For example, information on the maximum drivable clock frequency according to the temperature of the core may be stored in the look-up table 131. This information may be stored in the look-up table 131 in advance. The information on the maximum clock frequency stored in the look-up table 131 satisfies the TEI. Thus, the maximum drivable clock frequency according to the increase in temperature is stored in the look-up table 131 to increase.

The mode setting circuit 132 determines the operation mode of the plurality of cores C0 to Cn−1 with reference to the look-up table 131. The operation mode may be classified into a normal mode and a low power mode. In the normal mode, all of the plurality of cores C0 to Cn−1 may operate at the normal clock frequency. In the low power mode, some of the plurality of cores C0 to Cn−1 may operate at a first or second clock frequency higher than the normal clock frequency. The mode setting circuit 132 may determine the operating clock frequency for driving the plurality of cores C0 to Cn−1 and the cores to which the threads are allocated among the plurality of cores C0 to Cn−1 based on the core temperature information CT generated from the temperature monitoring and sorting circuit 120. The mode setting circuit 132 includes a frequency comparison circuit 132_1 and a power comparison circuit 132_2.

The frequency comparison circuit 132_1 compares the maximum clock frequency obtained from the look-up table 131 with the operating clock frequency of the current clock signal CLK. For this, the frequency comparison circuit 132_1 may read from the look-up table 131 the maximum clock frequency information corresponding to the lowest temperature among the temperatures of the plurality of cores C0 to Cn−1. The frequency comparison circuit 132_1 may determine the operating clock frequency of the subsequent clock signal CLK based on the result of comparison between the maximum clock frequency and the current operating clock frequency. The frequency comparison circuit 132_1 may include a comparison operation circuit for comparing the maximum clock frequency and the operation clock frequency.

When the ratio of the maximum clock frequency to the normal clock frequency is equal to or greater than the first reference value, the frequency comparator 132_1 may control the frequency controller 133 to adjust the operating clock frequency to the first clock frequency, which is a value obtained by multiplying the normal clock frequency by the first reference value. Also, the frequency comparison circuit 132_1 may control the thread allocation circuit 134 to activate that the cores by the first activation number, which is obtained by dividing the number of cores C0 to Cn−1 by the first reference value. When a value obtained by the number of cores by the first reference value is not an integer, the first activation number may be a value obtained by adding 1 to the divided quotient. The first reference value may be a real number greater than 1 and may be a preset value. The frequency comparison circuit 132_1 may provide the first low power mode signal to the frequency controller 133 such that the operating clock frequency is increased to the first clock frequency. In addition, the frequency comparison circuit 132_1 may also provide a first low power mode signal to the thread allocation circuit 134 such that the number of cores to be activated is reduced to the first activation number.

Even after the plurality of cores C0 to Cn−1 operate with the first low power mode signal, the frequency comparison circuit 132_1 continuously determines the operation mode of the plurality of cores C0 to Cn−1 using the core having the lowest temperature. After the operating clock frequency is increased to the first clock frequency, the frequency comparison circuit 132_1 may compare the normal clock frequency and the maximum clock frequency again. When the ratio of the maximum clock frequency to the normal clock frequency is equal to or greater than the second reference value, the frequency comparator 132_1 may control the frequency controller 133 to adjust the operating clock frequency to the second clock frequency, which is a value obtained by multiplying the normal clock frequency by the second reference value. The second reference value is larger than the first reference value. The frequency comparison circuit 132_1 may control the thread allocation circuit 134 to activate that the cores by the second activation number, which is obtained by dividing the number of cores C0 to Cn−1 by the second reference value. For this, the frequency comparison circuit 132_1 may provide a second low power mode signal to the frequency controller 133 and the thread allocation circuit 134.

When the maximum clock frequency is lower than the normal clock frequency, the frequency comparison circuit 132_1 may restore the operation mode of the plurality of cores C0 to Cn−1 to the normal mode in the first or second low power mode. When the maximum clock frequency is lower than the first clock frequency, the frequency comparison circuit 132_1 may restore the operation mode of the plurality of cores C0 to Cn−1 from the second low power mode to the first low power mode. When the temperature of the plurality of cores C0 to Cn−1 decreases, the maximum clock frequency may be lower than the operating clock frequency. For example, as described with reference to FIG. 4, when increasing the operating clock frequency of the cores and reducing the number of cores to be activated, the power consumption may be reduced. The temperature of the plurality of cores C0 to Cn−1 may be reduced based on the reduction of the power consumption.

When the maximum clock frequency is lower than the normal clock frequency, the frequency comparison circuit 132_1 may control the frequency controller 133 so that the operating clock frequency is adjusted to the normal clock frequency. In addition, the frequency comparison circuit 132_1 may control the thread allocation circuit 134 such that the plurality of cores C0 to Cn−1 are all activated. For this, the frequency comparison circuit 132_1 may provide a normal mode signal to the frequency controller 133 and the thread allocation circuit 134.

The power comparison circuit 132_2 determines the operation mode by comparing the expected power consumption and the current power consumption when the operation mode of the plurality of cores C0 to Cn−1 is changed. For example, the operation mode may be changed from the normal mode to the low power mode according to the comparison result of the frequency comparison circuit 132_1. The power comparison circuit 132_2 may calculate the power consumption in the normal mode, which is the current operation mode, and calculate the expected power consumption in the low power mode. When the power consumption in the normal mode is higher than the expected power consumption, the operation mode is changed from the normal mode to the low power mode. When the power consumption in the normal mode is not higher than the expected power consumption, the operation mode is not changed from the normal mode to the low power mode.

When changing the operation mode from the first low power mode to the second low power mode, the power comparison circuit 132_2 may compare the expected power consumption with the current power consumption. When the power consumption in the first low power mode is higher than the expected power consumption in the second low power mode, the operation mode may be changed from the first low power mode to the second low power mode. However, when the operation mode is changed from the first or second low power mode to the normal mode or when the operation mode is changed from the second low power mode to the first low power mode, the power comparison circuit 132_2 may not compare the current power consumption with the expected power consumption. In this case, since the operating clock frequency is higher than the maximum drivable clock frequency of the core, this is because it may be important to lower the operating clock frequency rather than reduce the power consumption.

The frequency controller 133 adjusts the operating clock frequency of the clock signal CLK according to the operation mode determined by the mode setting circuit 132. The frequency controller 133 may adjust the operating clock frequency of the clock signal CLK to the first clock frequency based on the first low power mode signal. The frequency controller 133 may adjust the operating clock frequency of the clock signal CLK to the second clock frequency based on the second low power mode signal. The frequency controller 133 may adjust the operating clock frequency of the clock signal CLK to the normal clock frequency based on the normal mode signal. The frequency controller 133 may have substantially the same configuration as the frequency controller 133 of FIG. 1.

The thread allocation circuit 134 may determine the cores to be activated among the plurality of cores C0 to Cn−1 according to the operation mode determined by the mode setting circuit 132. The thread allocation circuit 134 may activate the selected cores to power the first activated number of cores based on the first low power mode signal. The thread allocation circuit 134 may activate the selected cores to power the second activated number of cores based on the second low power mode signal. The thread allocation circuit 134 may activate the plurality of cores C0 to Cn−1 such that power is supplied to all of the plurality of cores C0 to Cn−1 based on the normal mode signal. For this, the thread allocation circuit 134 may output a sleep signal SL for determining whether to activate each of the plurality of cores C0 to Cn−1. The thread allocation circuit 134 may have substantially the same configuration as the thread allocation circuit 134 of FIG. 1.

The thread allocation circuit 134 may redistribute the threads so that the threads are allocated to the cores to be activated. The thread allocation circuit 134 may generate thread information TH on the activated cores based on the first or second low power mode signal. The thread allocation circuit 134 may generate the thread information TH so that a thread is allocated to all of the plurality of cores C0 to Cn−1 based on the normal mode signal.

Figure 6:
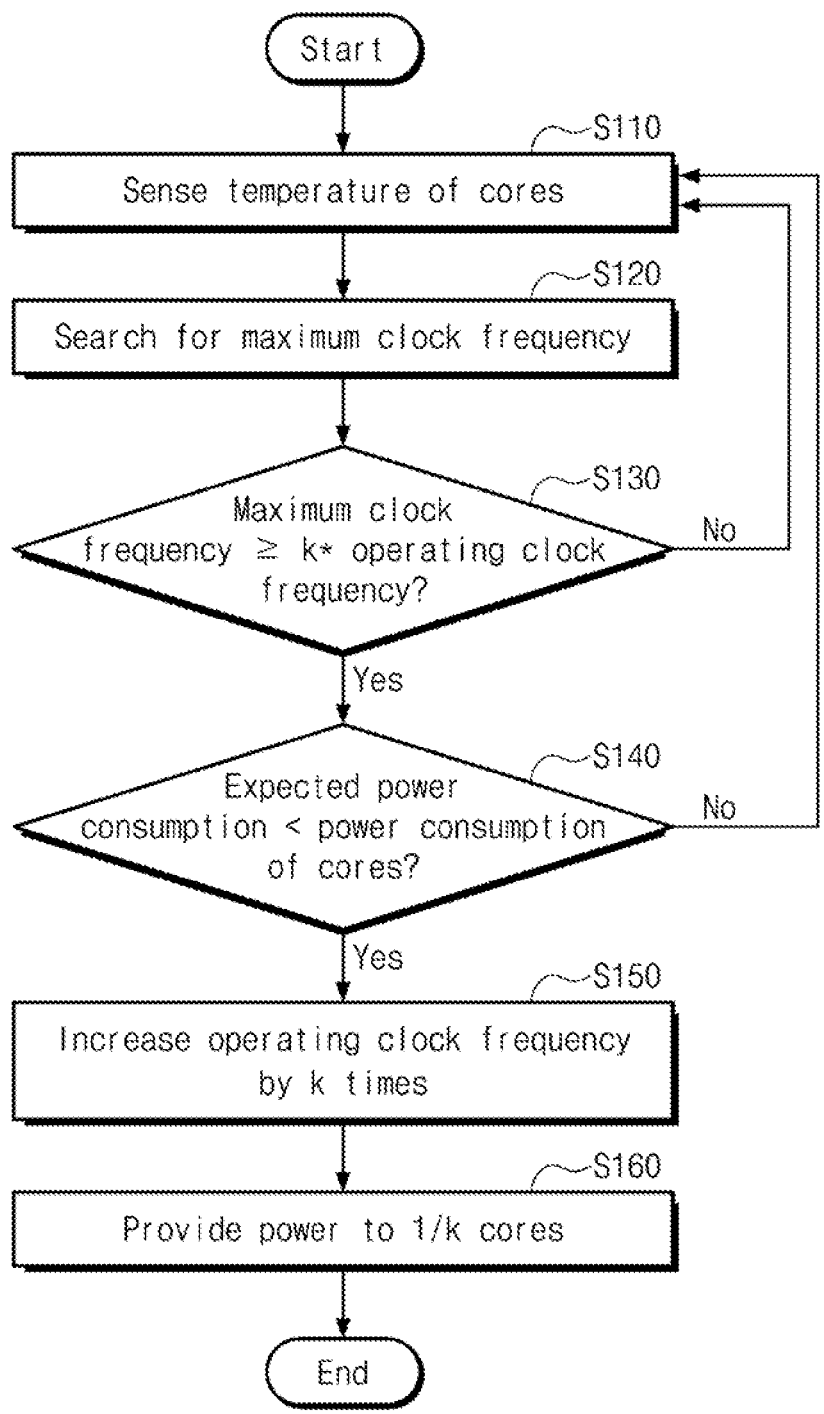
FIGS. 6 and 7 are flowcharts of an operation method of a graphics processing unit according to an embodiment of an inventive concept.
Figure 7:
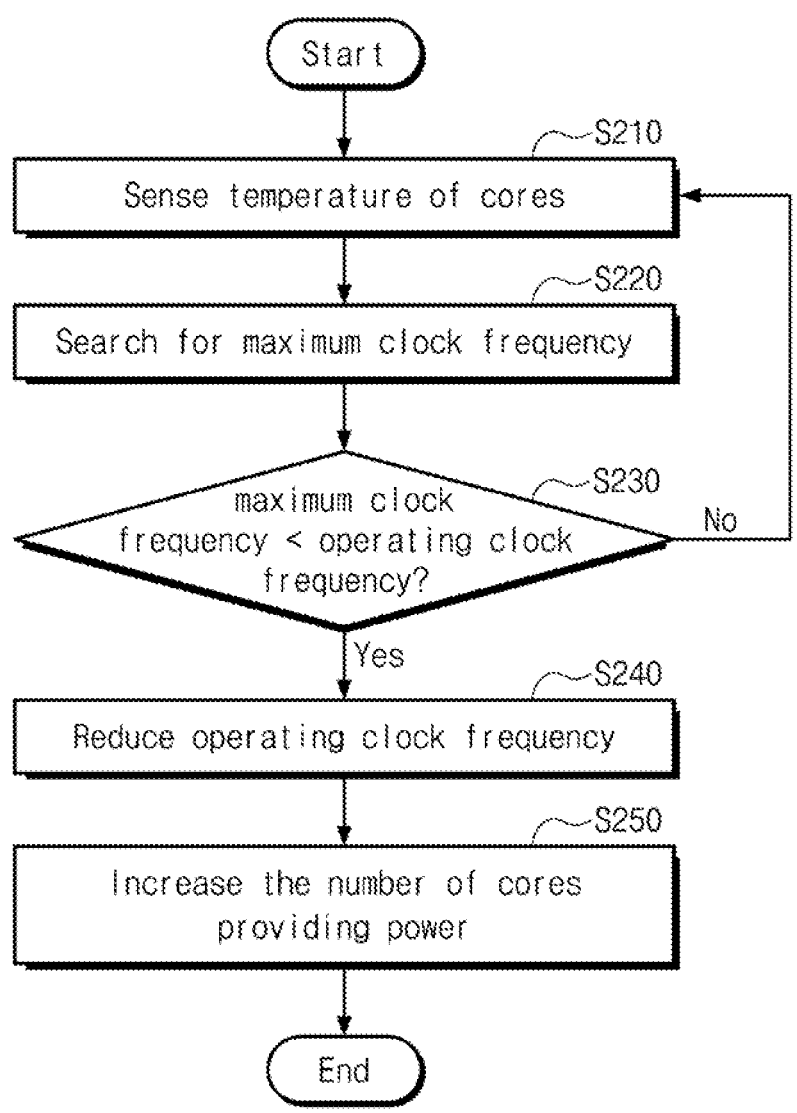

FIGS. 6 and 7 are flowcharts of an operation method of a graphics processing unit according to an embodiment of an inventive concept. FIG. 6 is a diagram for explaining a process of converting an operation mode from a normal mode to a low power mode according to an increase in temperature of a plurality of cores C0 to Cn−1. FIG. 7 is a diagram for explaining a process of converting an operation mode from a low power mode to a normal mode according to a decrease in temperature of a plurality of cores C0 to Cn−1. The operations of FIGS. 6 and 7 may be performed in the graphics processing unit 100 of FIG. 1. For convenience of explanation, referring to the reference numerals of FIGS. 1 and 5, operations of FIGS. 6 and 7 will be described.

Referring to FIG. 6, in operation S110, the plurality of cores C0 to Cn−1 sense the temperature of the corresponding cores. The temperature of the core may be sensed by the temperature sensor 115 included in the core C0 of FIG. 2. That is, since a temperature sensor included in each of the plurality of cores C0 to Cn−1 is used, the temperature of each of the plurality of cores C0 to Cn−1 may be individually sensed. The temperature monitoring and sorting circuit 120 monitors the temperatures of each of the plurality of cores C0 to Cn−1.

In operation S120, the controller 130 searches for the maximum drivable clock frequency of the core having the lowest temperature among the plurality of cores C0 to Cn−1. The temperature monitoring and sorting circuit 120 or the controller 130 detects one with the lowest temperature among the plurality of cores C0 to Cn−1 based on the sensed temperature from each of the plurality of cores C0 to Cn−1. The controller 130 may refer to the look-up table 131 and search for the maximum clock frequency corresponding to the detected lowest temperature. However, the inventive concept is not limited thereto, and the look-up table 131 for searching for the maximum clock frequency may be provided to the temperature monitoring and sorting circuit 120. In this case, the temperature monitoring and sorting circuit 120 may search for the maximum clock frequency.

In operation S130, the controller 130 compares the found maximum clock frequency with the operating clock frequency. The controller 130 may compare the maximum clock frequency with a value obtained by multiplying the operating clock frequency by a reference value k. When the maximum clock frequency is greater than k times the operating clock frequency, the controller 130 may determine that normal operation is possible even when the plurality of cores C0 to Cn−1 increase the operating clock frequency of the clock signal CLK by k times. In this case, operation S140 is performed. When the maximum clock frequency is not greater than k times the operating clock frequency, the controller 130 may determine that the plurality of cores C0 to Cn−1 may not increase the operating clock frequency by k times. In this case, the current operation mode is maintained, and operation S110 is performed.

In operation S140, the controller 130 may compare the power consumption of the plurality of cores C0 to Cn−1 in the current operation mode with the expected power consumption in the case of changing the operation mode. For example, when the current graphics processing unit 100 is operating in the normal mode, the controller 130 may compare with the power consumption of the entire plurality of cores C0 to Cn−1 operating at the normal clock frequency with the expected power consumption of the activated cores operating at the operating clock frequency of the low power mode. The controller 130 may calculate the number of cores to be activated when the operating clock frequency is increased by k times, and may calculate the expected power consumption when the calculated number of cores operates at the operating clock frequency increased by k times. When the expected power consumption is lower than the current power consumption, operation S150 is performed to convert the operation mode. When the expected power consumption is not lower than the current power consumption, the current operation mode is maintained and operation S110 is performed.

In operation S150, the frequency controller 133 may increase the operating clock frequency of the clock signal CLK by k times. The frequency controller 133 may adjust the operating clock frequency based on the low power mode signal provided by the mode setting circuit 132. Thus, the thread processing speed of activated cores among the plurality of cores C0 to Cn−1 may be increased.

In operation S160, the thread allocation circuit 134 may activate 1/k cores and deactivate the remaining cores. When 1/k is not an integer, the number of activated cores may be a rounding of 1/k. The thread allocation circuit 134 may adjust the number of cores to be activated based on the low power mode signal provided by the mode setting circuit 132. Power is provided to the activated cores, and activated cores process the threads based on the k times increased operating clock frequency. The thread allocation circuit 134 may redistribute threads as the number of cores to be activated changes. The thread allocation circuit 134 may allocate threads to the cores to be activated.

Referring to FIG. 7, in operation S210, the plurality of cores C0 to Cn−1 sense the temperature of the corresponding cores. In operation S220, the controller 130 searches for the maximum drivable clock frequency of the core having the lowest temperature among the plurality of cores C0 to Cn−1. Operations S210 and S220 are the same as operations S110 and S120 of FIG. 6. It is assumed that the current operation mode of FIG. 7 is a low power mode. Therefore, some cores of the plurality of cores C0 to Cn−1 are activated, and the remaining cores are inactivated.

In operation S230, the controller 130 compares the found maximum clock frequency with the operating clock frequency. The operating clock frequency here may be the clock frequency of the clock signal CLK for driving the plurality of cores C0 to Cn−1 in the low power mode. When the maximum clock frequency is lower than the operating clock frequency, the controller 130 may determine that normal operation is difficult when the low-power mode is maintained. In this case, operation S240 is performed. When the maximum clock frequency is not lower than the operating clock frequency, the controller 130 may determine that the low power mode is maintained. In this case, the low power mode which is the current operation mode is maintained, and operation S210 is performed.

In operation S240, the frequency controller 133 reduces the operating clock frequency of the clock signal CLK. To operate in low power mode, when the operating clock frequency is increased to k times the normal clock frequency, the frequency controller 133 may reduce the operating clock frequency back to the normal clock frequency.

The frequency controller 133 may adjust the operating clock frequency based on the normal mode signal provided by the mode setting circuit 132.

In operation S250, the thread allocation circuit 134 increases the number of cores that provide power. The thread allocation circuit 134 may activate the entire plurality of cores C0 to Cn−1 based on the normal mode signal provided by the mode setting circuit 132. Power is provided to the entire plurality of cores C0 to Cn−1, and the thread is processed based on the reduced operating clock frequency. The thread allocation circuit 134 may redistribute the threads as the number of cores to be activated increases. The thread allocation circuit 134 may allocate a thread to the entire plurality of cores C0 to Cn−1.

According to an embodiment of the inventive concept, the graphics processing unit and its operation method control the operation of the core using the TEI, such that it may maintain the performance of the graphics processing unit while reducing power consumption.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A graphics processing unit comprising:
  a plurality of cores in which a delay time between an input and an output decreases according to an increase of a temperature;
  a temperature monitoring and sorting circuit configured to monitor a temperature of each core of the plurality of cores; and
  a controller configured to control a clock frequency and a power supply of the plurality of cores based on a drivable clock frequency of a core having the lowest temperature among temperatures of each of the plurality of monitored cores,
  wherein the drivable clock frequency of the core having the lowest temperature is a maximum drivable clock frequency of the core having the lowest temperature, and
  wherein when the maximum drivable clock frequency is higher than the operating clock frequency by a multiple of a reference value, the controller increases the operating clock frequency by a multiple of the reference value and supplies the power to cores of the inverse number of the reference value among the plurality of cores.

2. The graphics processing unit of claim 1, wherein each core of the plurality of cores comprises a respective temperature sensor for sensing a temperature.

3. The graphics processing unit of claim 1, wherein the controller compares the maximum drivable clock frequency of the core having the lowest temperature with a current operating clock frequency to adjust the operating clock frequency and determine a core to which the power is supplied.

4. The graphics processing unit of claim 1, wherein when the maximum drivable clock frequency is lower than the operating clock frequency, the controller lowers the operating clock frequency and increases the number of cores to which the power is supplied.

5. The graphics processing unit of claim 1, wherein the controller comprises:
  a frequency controller configured to control the operating clock frequency by referring to a look-up table storing information on a maximum clock frequency according to a temperature of a core; and a thread allocation circuit configured to allocate a thread to the core to which the power is supplied by referring to the look-up table.

6. The graphics processing unit of claim 1, further comprising a plurality of transistors connected to the plurality of cores, respectively, to transmit the power to a corresponding core or interrupt the power according to a control of the controller.

7. The graphics processing unit of claim 1, wherein when the maximum drivable clock frequency of the core having the lowest temperature is higher than a current operating clock frequency, the controller determines a portion of the plurality of cores to which the power is to be supplied based on a temperature of each core of the plurality of cores.

8. The graphics processing unit of claim 1, wherein a driving voltage for driving the plurality of cores is an Ultra-Low Voltage (ULV) of 1 V or less.

9. An operation method of a graphics processing unit, the method comprising:

sensing a temperature of each core of a plurality of cores in which a delay time between an input and an output decreases according to an increase of a temperature;

comparing the maximum clock frequency of a core having the lowest temperature among the sensed temperatures of the plurality of cores with an operating clock frequency of the plurality of cores;

adjusting the operating clock frequency based on a result of the comparison between the maximum clock frequency and the operating clock frequency, including when a ratio of the maximum clock frequency to the operating clock frequency is greater than or equal to a reference value, multiplying the operating clock frequency by the reference value; and determining a core to which power is provided based on the result of the comparison between the maximum clock frequency and the operating clock frequency.

10. The method of claim 9, wherein comparing the maximum clock frequency with the operating clock frequency comprises searching a look-up table for the maximum clock frequency for the lowest temperature.

11. The method of claim 9, wherein adjusting the operating clock frequency comprises:

when the maximum clock frequency is lower than the operating clock frequency, lowering the operating clock frequency.

12. The method of claim 9, wherein determining the core to which the power is provided comprises:

calculating a number of cores to provide the power based on the adjusted operating clock frequency;

calculating expected power consumption when driving the calculated number of cores at the adjusted operating clock frequency; and comparing a power consumption of the plurality of cores with the expected power consumption to adjust the operating clock frequency and determine the core to which the power is provided.

13. The method of claim 9, wherein determining the core to which the power is provided comprises:

when a ratio of the maximum clock frequency to the operating clock frequency is greater than or equal to a reference value, decreasing a number of cores to which the power is provided based on a value obtained by dividing the number of cores by the reference value.

14. The method of claim 9, wherein determining the core to which the power is provided comprises:

when the maximum clock frequency is lower than the operating clock frequency, increasing a number of cores to which the power is provided.

15. The method of claim 9, further comprising redistributing a thread to the core to which the power is provided.

* * * * *